United States Patent
Wang et al.

(10) Patent No.: US 10,719,664 B2
(45) Date of Patent: Jul. 21, 2020

(54) CROSS-MEDIA SEARCH METHOD

(71) Applicant: Peking University Shenzhen Graduate School, Shenzhen (CN)

(72) Inventors: Wenmin Wang, Shenzhen (CN); Liang Han, Shenzhen (CN); Mengdi Fan, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Hui Zhao, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 36 days.

(21) Appl. No.: 16/314,673

(22) PCT Filed: Dec. 1, 2016

(86) PCT No.: PCT/CN2016/108196
§ 371 (c)(1),
(2) Date: Jan. 1, 2019

(87) PCT Pub. No.: WO2018/010365
PCT Pub. Date: Jan. 18, 2018

(65) Prior Publication Data
US 2019/0205393 A1      Jul. 4, 2019

(30) Foreign Application Priority Data

Jul. 11, 2016   (CN) .......................... 2016 1 0544156

(51) Int. Cl.
G06F 16/00      (2019.01)
G06T 11/60      (2006.01)
(Continued)

(52) U.S. Cl.
CPC .............. G06F 40/30 (2020.01); G06F 16/00 (2019.01); G06F 40/216 (2020.01);
(Continued)

(58) Field of Classification Search
CPC ............................ G06F 17/00; G06F 16/5838
See application file for complete search history.

(56) References Cited

U.S. PATENT DOCUMENTS 9,280,562 B1 * 3/2016 Zhang .................. G06K 9/6278

* cited by examiner

*Primary Examiner* — Joshua L Schwartz
(74) *Attorney, Agent, or Firm* — SV Patent Service (57) ABSTRACT

A cross-media search method using a VGG convolutional neural network (VGG net) to extract image features. The 4096-dimensional feature of a seventh fully-connected layer (fc7) in the VGG net, after processing by a ReLU activation function, serves as image features. A Fisher Vector based on Word2vec is utilized to extract text features. Semantic matching is performed on heterogeneous images and the text features by means of logistic regression. A correlation between the two heterogeneous features, which are images and text, is found by means of semantic matching based on logistic regression, and thus cross-media search is achieved. The feature extraction method can effectively indicate deep semantics of image and text, improve cross-media search accuracy, and thus greatly improve the cross-media search effect.

5 Claims, 3 Drawing Sheets

(51) Int. Cl.
  *G06F 40/30*  (2020.01)
  *G06F 40/216*  (2020.01)
  *G06F 40/284*  (2020.01)
  *G06N 20/00*  (2019.01)
  *G06K 9/00*  (2006.01)
  *G06K 9/62*  (2006.01)
  *G06N 3/08*  (2006.01)
  *G06N 7/00*  (2006.01)

(52) U.S. Cl.
  CPC ....... *G06F 40/284* (2020.01); *G06K 9/00523* (2013.01); *G06K 9/00536* (2013.01); *G06K 9/628* (2013.01); *G06K 9/6277* (2013.01); *G06N 3/08* (2013.01); *G06N 7/005* (2013.01); *G06N 20/00* (2019.01); *G06T 11/60* (2013.01)

Figure 1

Martin Luther King's presence in Birmingham was not welcomed by all in the black community. A black attorney was quoted in "Time" magazine as saying, "The new administration should have been given a chance to confer with the various groups interested in change." Black hotel owner A. G. Gaston stated, "I regret the absence of continued communication between white and Negro leadership in our city." A white Jesuit priest assisting in desegregation negotiations attested, "These demonstrations are poorly timed and misdirected." Protest organizers knew they would meet with violence from the Birmingham Police Department but chose a confrontational approach to get the attention of the federal government. Reverend Wyatt Tee Walker, one of the SCLC founders and the executive director from 1960-1964, planned the tactics of the direct action protests, specifically targeting Bull Connor's tendency to react to demonstrations with violence. "My theory was that if we mounted a strong nonviolent movement, the opposition would surely do something to attract the media, and in turn induce national sympathy and attention to the everyday segregated circumstance of a person living in the Deep South," Walker said. He headed the planning of what he called Project C, which stood for "confrontation". According to this historians Laserman and Kazin, the demands on the city authorities were straightforward: desegregate the economic life of Birmingham its restaurants, hotels, public toilets, and the unwritten policy of hiring blacks for menial jobs only Maurice Isserman and Michael Kazin, America Divided: The Civil War of the 1960s. (Oxford, 2008), p.90. Organizers believed their phones were tapped, so to prevent their plans from being leaked and perhaps in 'leaning the mayoral election, they used code words for demonstrations. The plan called for direct nonviolent action to attract media attention to "the biggest and baddest city of the South" Hampton, p. 126. In preparation for the protests, Walker timed the walking distance from the Sixteenth Street Baptist Church, headquarters for the campaign, to the downtown area. He surveyed the segregated lunch counters of department stores, and listed federal buildings as secondary targets should police block the protesters' entrance into primary targets such as stores, libraries, and all-white churches.

CROSS-MEDIA SEARCH METHOD

TECHNICAL FIELD

The present invention belongs to the technical field of deep learning and multimedia search, and in particular, relates to a cross-media search method, which uses a convolutional neural network (VGG net) to extract image features and a Fisher Vector to extract text features.

BACKGROUND OF THE INVENTION

With the rapid development of Internet, different types of multimedia data such as images, text, video, and audio have grown rapidly, which often appear at the same time to describe the same thing. The information of different modalities reflects different attributes of things, and people obtain information of different modalities to satisfy the desires to describe things in different forms. For example, for an image, we want to find a description of the text associated with the image. For a piece of text, we like to find an image or a video that matches the semantics of the text. To meet these needs, relevant technologies for cross-media search are required.

Most of the existing search systems are based on single modal text information, e.g., search engines such as Google and Baidu. The function of searching images, audio and video by query request is essentially matching the content on a meta-database composed of text information. This type of search still belongs to the traditional keyword-based search technology. Although keywords can accurately describe the details of a concept, it is difficult to present a picture or a piece of video in a complete and vivid manner, and the text description may carry subjectivity of the labeling person. Subject to this inherent flaw, many scholars turn to the study on content-based search technologies, enabling computers to more accurately understand the content of multimedia information by fully mining the semantic association of multimedia data. However, content-based search generally only focuses on the underlying features of the media and is usually subject to a single modality media object. Query and search results must be in the same modality, and comprehensive search cannot be conducted across various media types. Therefore, the concept of cross-media search was proposed. Cross-media search is a medium that does not rely on a single modality, which can realize mutual search between any modal media. By inputting information of any type of media, one can get related media information through cross-media search and search results that meet the requirements in the huge amount of multi-modalities data more quickly.

Existing cross-media search methods mainly concern three key issues: cross-media metrics, cross-media indexing, and cross-media sorting. Typical methods for these three key problems are cross-media metrics methods based on matching models, cross-media indexing methods based on hash learning, and cross-media sorting methods based on sorting learning as follows:

First, a cross-media metrics method based on matching model. The matching model is trained by the training data of the known category to mine the internal relationship between different types of data, and then the similarity between the cross-media data is calculated, and the search results with the highest correlation are returned. There are two matching methods: one is based on correlation matching, such as the method using Canonical Correlation Analysis (CCA); the other is Semantic Matching (SM), such as using multi-class logistic regression for semantic classification.

Second, a cross-media indexing method based on hash learning. Subject to massive amounts of big data on the Internet, people have put forward higher requirements for search speed. Hash index is an effective way to speed up Approximate Nearest Neighbor (ANN) search. The method converts the original feature data into a binary hash code through the learned hash model, while maintaining the neighbor relationship in the original space as much as possible, that is, maintaining the correlation.

Third, a cross-media sorting method based on sorting learning. The purpose of cross-media sorting is to learn a semantic similarity-based sorting model between different modalities. The specific method is to make a better sort of the search results after searching the semantically related cross-media data, so that the more relevant data is more advanced, and the optimization process is continuously iterated until it is convergent to obtain the optimal search results.

Of the above methods, almost all image features and text features used are traditional artificial features, such as SIFT features. With the continuous improvement of computer processing performance and computing capacity, these traditional artificial features have inhibited the improvement of cross-media search performance. In the past year, people began to focus on the combination of related technologies of deep learning and cross-media search. It is shown that the effective application of deep learning can often bring breakthroughs to the effectiveness of searches.

SUMMARY OF THE INVENTION

To overcome the above-described deficiencies in existing technologies, a new cross-media search method is provided in the present invention. A convolutional neural network (VGG net) proposed by Visual Geometry Group (VGG) is utilized to extract image features. A Fisher Vector based on Word2vec is utilized to extract text features. Semantic matching is performed on heterogeneous images and the text features by means of logistic regression, to achieve cross-media search. Existing cross-media search methods are generally based on traditional artificial extraction features. Compared to the traditional artificial features, the feature extraction method in the present invention can effectively indicate deep semantics of image and text, improve the accuracy of cross-media search, and thus greatly improve the effectiveness of the cross-media search.

The principle of the present invention: A VGG convolutional neural network (VGG net) (described in literature [1] Simonyan K, Zisserman A. Very Deep Convolutional Networks for Large-Scale Image Recognition [J]. Computer Science, 2014) is utilized to extract image features; a Fisher Vector based on Word2vec is utilized to extract text features; a correlation between the two heterogeneous features of the image and the text is found by Semantic Matching (SM) based on logistic regression, and thus cross-media search is achieved. The features proposed in the present invention can express semantics of images and text more effectively, and improve the accuracy of cross-media search.

The technical solution provided in the present invention includes:

A cross-media search method utilizes A VGG convolutional neural network (VGG net) proposed by VGG to extract image features, utilizes a Fisher Vector based on Word2vec to extract text features, and performs semantic matching on heterogeneous images and the text features by means of logistic regression, to accomplish cross-media search. The method includes the following steps:

1) collecting a cross-media search dataset containing category labels, and setting as $D=\{D_1, D_2, \ldots, D_n\}$, where n represents the size of dataset, wherein the data types in the cross-media search dataset include image and text media, represented as image-text pairs $D_i(D_i \in D)$, $D_i=(D_i^I, D_i^T)$, where $D_i^I$ represents the original data of the image, and $D_i^T$ represents the original text data, wherein the category labels are set as L, $L=[l_1, l_2, \ldots, l_n]$, where $l_j \in [1, 2, \ldots C]$, C is the number of categories, and $l_i$ represents the category to which the $i^{th}$ pair of images and text belong; and dividing the cross-media search dataset into training data and test data;

2) for all image data $D^I$ in dataset D, where $D^I=\{D_1^I, D_2^I, \ldots, D_n^I\}$, using a VGG convolutional neural network (VGG net) to extract image features, wherein the 4096-dimensional features of a seventh fully-connected layer (fc7) in the VGG net, after processing by a ReLU activation function, are denoted as $I=\{I_1, I_2, \ldots, I_n\}$, where $I_j \in R^{4096}$ and $j \in [1,n]$, serving as image features;

3) for the text feature data $D^T$ in the dataset, where $D^T=\{D_1^T, D_2^T, \ldots, D_n^T\}$, using a Fisher Vector based on Word2vec to extract text features; specifically; converting $D^T$ into a word vector set $W=\{W_1, W_2, \ldots, W_n\}$, where W is a word vector set of words contained in $D^T$; substituting the word vector set Wi of each text word in $W=\{W_1, W_2, \ldots, W_n\}$ into X; and obtaining the Fisher Vector for each text, denoted as $T=\{T_1, T_2, \ldots, T_n\}$, $T_i \in R^{(2 \times dw+1) \times G-1}$ and $i \in [1,n]$, where $T_i$ represents the Fisher Vector calculated from the $i^{th}$ text; and thus extracting text features;

4) training a semantic matching model based on logistic regression by using the image features and text features in the training data obtained by performing Step 2) and Step 3), converting the text feature T into a text semantic feature $\Pi^T$, $\Pi^T=\{\Pi_1^T, \Pi_2^T, \ldots, \Pi_n^T\}$, $\Pi_i^T \in R^c$, $i \in [1,n]$, where c is the number of categories, and the dimension of the text semantic feature; and transforming the image feature $I_i$ into the semantic feature composed of the posterior probability, which is $P_{L|I_i}(k|I_i)$, $k \in [1,C]$, indicating the probability of image $I_i$ belonging to category k; and 5) testing an image or text using the semantic matching model trained in Step 4), and the image features and text features of the test data obtained in Step 2) and Step 3), to obtain related texts or images, that is, cross-media search results.

Further, for the above cross-media search method, in Step 3), the step of using a Fisher Vector based on Word2vec to extract text features, includes:

31) converting the original text data $D^T$, where $D^T=\{D_1^T, D_2^T, \ldots, D_n^T\}$, to a word vector set $W=\{W_1, W_2, \ldots, W_n\}$, where W is a word vector set of the words contained in $D^T$;

32) recording the word as w, and the word vector corresponding to the word w as $f_{word2vec}(W)$; for $\Pi w \in D_i^T$, $f_{word2vec}(W) \in W_i$, $i \in [1,n]$, that is $W_i=\{w_{i,1}, w_{i,2}, \ldots, w_{i,b_i}\}$, where $w_{i,j} \in R^{dw}$, $j \in [1,b_i]$, $w_{i,j}$ is the word vector corresponding to the word contained in $D_i^T$, dw is the dimension of the word vector, and $b_i$ is the number of words contained in $D_i^T$;

33) using $X=\{x_1, x_2, \ldots, x_{nw}\}$ to represent the word vector set for a text, where nw is the number of word vectors; letting the parameters of the mixed Gaussian model GMM be $\lambda$, $\lambda=\{\omega_i, \mu_i, \Sigma_i, i=1 \ldots G\}$, where $\omega_i$, $\mu_i$ and $\Sigma_i$ represent the weight, mean vector and covariance matrix of each Gaussian function in a GMM function, respectively, and G represents the number of Gaussian functions in the model, wherein the GMM function is defined as Equation 1:

$$L(X|\lambda)=\Sigma_{t=1}^{nw} \log p(x_t|\lambda), \qquad (1)$$

where $p(x_t|\lambda)$ represents the probability generated by the GMM function for the vector $x_t$ ($t \in [1,nw]$), expressed as Equation 2:

$$p(x_t|\lambda)=\Sigma_{i=1}^{G} \omega_i p_i(x_t|\lambda) \qquad (2)$$

Setting the sum of constraints of weight $\omega_i$ as 1, expressed as Equation 3:

$$\Sigma_{i=1}^{G} \omega_i = 1 \qquad (3)$$

where $p_i(x|\lambda)$ represents the $i^{th}$ Gaussian function in the GMM, given by Equation 4:

$$p_i(x|\lambda) = \frac{\exp\left\{-\frac{1}{2}(x-\mu_i)^T \Sigma_i^{-1}(x-\mu_i)\right\}}{(2\pi)^{dw/2}|\Sigma_i|^{1/2}} \qquad (4)$$

where dw is the dimension of the vector, and $|\Sigma_i|$ represents the determinant to get $\Sigma_i$, wherein $\gamma_t(i)$ represents the probability of vector $x_t$ generated by the $i^{th}$ Gaussian function, expressed as Equation 5:

$$\gamma_t(i) = \frac{\omega_i p_i(x_t|\lambda)}{\sum_{j=1}^{N} \omega_j p_j(x_t|\lambda)} \qquad (5)$$

34) obtaining the Fisher Vector by partializing the parameters of the Gaussian model, wherein the Fisher Vector is a vector combining the derivation results of all the parameters, where the number of Gaussian functions in the Gaussian Mixture Model (GMM) is G, the vector dimension is dw, the dimension of the Fisher Vector is $(2 \times dw+1) \times G-1$, and the degree of freedom of the weight co is N−1; and 35) substituting each text word vector set Wi in $W=\{W_1, W_2, \ldots, W_n\}$ into the text word vector set X in Equation 1, to obtain the Fisher Vector for each text, denoted as $T=\{T_1, T_2, \ldots, T_n\}$, $T_i \in R^{(2 \times dw+1) \times G-1}$ and $i \in [1,n]$, where $T_i$ represents the Fisher Vector calculated from the $i^{th}$ text.

Furthermore, in Step 34), partialize the parameters of the Gaussian model. Specifically, the derivation formula for each parameter is as shown in Equation 6~8:

$$\frac{\partial L(X|\lambda)}{\partial \omega_i} = \sum_{t=1}^{T}\left[\frac{\gamma_t(i)}{\omega_i} - \frac{\gamma_t(1)}{\omega_1}\right] \qquad (6)$$

$$\frac{\partial L(X|\lambda)}{\partial \mu_i^d} = \sum_{t=1}^{T} \gamma_t(i)\left[\frac{x_t^d - \mu_i^d}{(\sigma_i^d)^2}\right] \qquad (7)$$

$$\frac{\partial L(X|\lambda)}{\partial \sigma_i^d} = \sum_{t=1}^{T} \gamma_t(i)\left[\frac{(x_t^d - \mu_i^d)^2}{(\sigma_i^d)^3} - \frac{1}{\sigma_i^d}\right] \qquad (8)$$

where the superscript d represents the $d^{th}$ dimension of the vector.

For the above cross-media search method, further, in Step 4), train the semantic matching model based on logistic regression using the image features and text features in the training data, the image feature is $I=\{I_1, I_2, \ldots, I_n\}$, $I_i \in R^{4096}$; the text feature is $T=\{T_1, T_2, \ldots, T_n\}$, $T_i \in R^{(2 \times dw+1) \times G-1}$; the corresponding image features and text features have a common label of $L=[l_1, l_2, \ldots, l_n]$, where $l_i \in [1, 2, \ldots, C]$; Specifically, the training comprising the steps of:

41) the text feature $T_i$ is converted into a semantic feature $\Pi^T$ consisting of posterior probabilities, wherein $\Pi^T = \{\Pi_1^T, \Pi_2^T, \ldots, \Pi_n^T\}$, $\Pi_i^T \in R^c, i \in [1,n]$, in which c is the number of categories and also the dimension of the semantic features of the text, is expressed as Equation 10:

$$(\Pi_i^T)^d = P_{L|T_i}(d|T_i), d \in [1,c] \quad (10)$$

where the superscript d represents the d-th dimension of the vector; the posterior probability is $P_{L|T_i}(k|T_i)$, $k \in [1,C]$, indicating the probability of $T_i$ belonging to category k; calculating $P_{L|T_i}(k|T_i)$ using Equation 9:

$$P_{L|T_i}(k|T_i) = P_{L|T_i}(k|T_i; w^T) = \frac{\exp((w_k^T)' T_i)}{\sum_{j=1}^{C} \exp((w_j^T)' T_i)} \quad (9)$$

where $w^T = \{w_1^T, w_2^T, \ldots, w_C^T\}$, $w_k^T \in R^{D_T}$ is a parameter of the multi-class logistic regression linear classifier, $(w_k^T)'$ represents the transpose of $w_k^T$, $w_k^T$ corresponds to category k, where $D_T = (2 \times dw + 1) \times G - 1$, $D_T$ is the dimension of the text feature;

42) converting image feature T into image semantic feature $\Pi^I$, wherein $\Pi^I = \{\Pi_1^I, \Pi_2^I, \ldots, \Pi_n^I\}$, $\Pi_i^I \in R^c$, $i \in [1,n]$, c being the number of categories and also the dimension of the semantic features of the image, is expressed as Equation 12:

$$(\Pi_i^I)^d = P_{L|I_i}(d|I_i), d \in [1,c] \quad (12)$$

where the superscript d represents the d-th dimension of the vector, wherein the posterior probability is $P_{L|I_i}(k|I_i)$, $k \in [1,C]$, indicating the probability of image $I_i$ belonging to category k, where the formula for calculating $P_{L|I_i}(k|I_i)$ is as follows:

$$P_{L|I_i}(k|I_i) = P_{L|I_i}(k|I_i; w^I) = \frac{\exp((w_k^I)' T_i)}{\sum_{j=1}^{C} \exp((w_j^I)' T_i)} \quad (11)$$

where $W^I = \{w_1^I, w_2^I, \ldots, w_C^I\}$, $w_k^I \in R^{D_I}$, is a parameter of the multi-class logistic regression linear classifier; $w_k^I$ corresponds to category k, a vector of $D_I$ dimensions; $D_I$ is the dimension of the image feature.

Further, for the above cross-media search method, as in Step 5), the step of testing an image or text to obtain the related text or image includes a correlation measurement methods comprising one or more of the Kullback-Leibler divergence method, Normalized Correlation method, Centered Correlation method, or L2 paradigm method.

Compared with the conventional technologies, the beneficial effects of the present invention are:

In the present invention, a VGG convolutional neural network (VGG net) is utilized to extract image features, a Fisher Vector feature based on Word2vec is utilized as text features, and a neural network is used to extract features in both the image and the text. Compared with traditional artificial features, neural network features are more complex and more suitable for representing the content of images and text. Therefore, the effectiveness of search is greatly improved while using the neural network features for cross-media search.

Specifically, the present invention has the following advantages: firstly, a neural network is adopted in the present invention to simulate a biological vision neural network system, representing pixel-level features as more abstract higher-level features for interpreting image data. Secondly, the technical solution of the present invention benefits from the improvement of computer computing performance. Neural network features are obtained through more complicated calculations. Good effects are achieved after training through large-scale data.

DETAILED DESCRIPTION OF THE INVENTION

The present invention is further described below with reference to the accompanying drawings in the embodiments of the present invention, but not limited to the scope of the invention in any way.

A new cross-media search method is provided in the present invention. A Visual Geometry Group (VGG) convolutional neural network (VGG net) is utilized to extract image features. A Fisher Vector based on Word2vec is utilized to extract text features. Semantic matching is performed on heterogeneous images and the text features by means of logistic regression, and thus cross-media search is achieved. Existing cross-media search methods are generally based on traditional artificial extraction features. Compared to traditional artificial features, the presently disclosed feature extraction method can effectively indicate deep semantics of image and text, improve cross-media search accuracy, and thus greatly improve the cross-media search effect.

Figure 1:
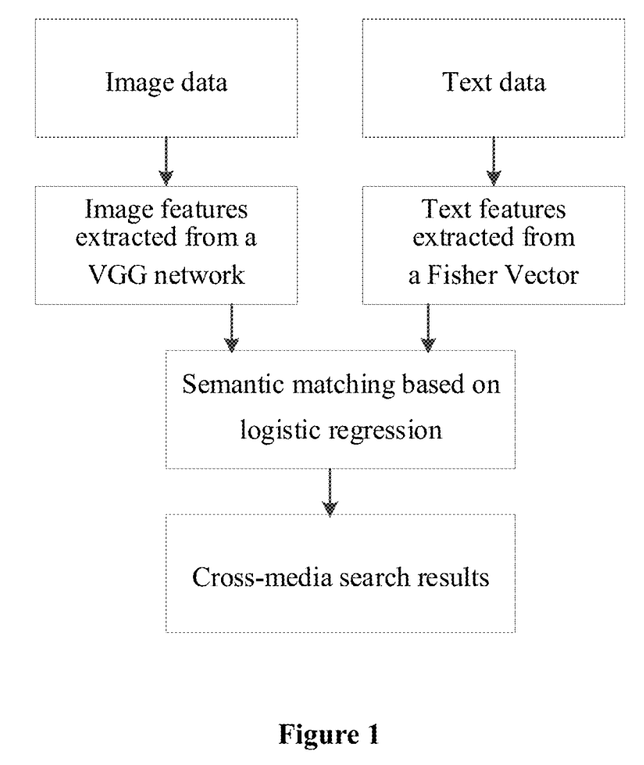
FIG. 1 shows a flowchart of a cross-media search method according to the present invention.

FIG. 1 illustrates a flowchart of a cross-media search method according to some embodiments of the present invention. The method includes the following steps:

Step 1) collecting a cross-media search dataset containing image type and text type with category labels, dividing the image and the text into training data and test data respectively;

Step 2) for all image data in the dataset, using a VGG convolutional neural network (VGG net) to extract image features;

Step 3) for the text features in the dataset, using a Fisher Vector based on Word2vec to extract text features;

Step 4) training the semantic matching model based on logistic regression using the image features and text features in the training data obtained in Step 2) and Step 3); and Step 5) testing the image features and text features of the test data obtained in Step 2) and Step 3) to test the effect of the present invention.

Specifically, the above steps respectively include the following process:

In step 1), collecting a cross-media search dataset containing image type and text type with category labels (e.g., 20 categories in the pascal sentence dataset, such as aircraft, cars, birds, etc.), dividing the dataset into training data and test data respectively;

Defining the dataset as $D=\{D_1, D_2, \ldots, D_n\}$, where n represents the size of dataset, and any image-text pair $D_i(D_i \in D)$ can be expressed as $D_i=(D_i^I, D_i^T)$, where $D_i^I$ represents the original data of the image, and $D_i^T$ represents the original data of the text. $L=[l_1, l_2, \ldots, l_n]$, where $l_i \in [1, 2, \ldots, C]$, C is the number of categories, and $l_i$ represents the category to which the i-th pair of images and text belongs.

In step 2), for all image data in the dataset, a VGG convolutional neural network (VGG net) is utilized to extract image features.

The VGG convolutional neural network (VGG net) has five configurations of A~E, and the number of convolutional layers increases from 8 to 16. In the embodiment of the present invention, preferably, the number of convolution layers used is 16 layers, plus 3 fully-connected layers, and a VGG net of total 19 layers.

After each image is input into the VGG net, a 4096-dimensional vector is obtained in the seventh fully-connected layer (fc7) in the VGG net. After processing by a ReLU (Rectified Linear Units) activation function, the vector serves as image features. Specifically, the original image data $D^I$, where $D^I=\{D_1^I, D_2^I, \ldots, D_n^I\}$, is input into the VGG net to extract image features. The image feature is the 4096-dimensional feature of the seventh fully-connected layer (fc7), after processing by a ReLU (Rectified Linear Units) activation function, denoted as $I=\{I_1, I_2, \ldots, I_n\}$, where $I_j \in R^{4096}$, $j \in [1,n]$.

In step 3), for the text features in the dataset, a Fisher Vector based on Word2vec is utilized to extract text features.

The original text data $D^T$, where $D^T=\{D_1^T, D_2^T, \ldots, D_n^T\}$, is converted into a word vector set $W=\{W_1, W_2, \ldots, W_n\}$, and W is a word vector set of words contained in $D^T$.

Further, the word is denoted as w, and the word vector corresponding to the word w is $f_{word2vec}(w)$, then for $\forall w \in D_i^T$, get $f_{word2vec}(w) \in W_i$, $i \in [1,n]$. That is, $W_i=\{w_{i,1}, w_{i,2}, \ldots, w_{i,b_i}\}$, where $w_{i,j} \in R^{dw}$, $j \in [1,b_i]$, $w_{i,j}$ is the word vector corresponding to the word contained in $D_i^T$, dw is the dimension of the word vector, and $b_i$ is the number of words contained in $D_i^T$;

Here it is assumed that $X=\{x_1, x_2, \ldots, x_{nw}\}$ represents a word vector set for a text, nw is the number of word vectors; let the parameters of the mixed Gaussian model (Gaussian Mixture Model, GMM) be $\lambda$, $\lambda=\{\omega_i, \mu_i, \Sigma_i, i=1 \ldots G\}$, where $\omega_i, \mu_i, \Sigma_i$ represent the weight, mean vector and covariance matrix of each Gaussian function in the GMM, respectively, and G represents the number of Gaussian functions in the model;

The GMM function is defined as follows:

$$L(X|\lambda) = \sum_{t=1}^{nw} \log p(x_t|\lambda), \quad (1)$$

where $p(x_t|\lambda)$ represents the probability generated by the GMM for the vector $x_t(t \in [1,nw])$, expressed as Equation 2:

$$p(x_t|\lambda) = \sum_{i=1}^{G} \omega_i p_i(x_t|\lambda) \quad (2)$$

Setting the sum of constraints of weight $\omega_i$ to 1, expressed as Equation 3:

$$\sum_{i=1}^{G} \omega_i = 1, \quad (3)$$

where $p_i(x|\lambda)$ represents the ith Gaussian function in the GMM, given by Equation 4:

$$p_i(x|\lambda) = \frac{\exp\left\{-\frac{1}{2}(x-\mu_i)^T \sum_i^{-1} (x-\mu_i)\right\}}{(2\pi)^{dw/2} |\Sigma_i|^{1/2}} \quad (4)$$

where dw is the dimension of the vector, and $|\Sigma_i|$ represents the determinant to get $\Sigma_i$; $\gamma_t(i)$ represents the probability of vector $x_t$ generated by the ith Gaussian function, which is expressed as Equation 5:

$$\gamma_t(i) = \frac{\omega_i p_i(x_t|\lambda)}{\sum_{j=1}^{N} \omega_j p_j(x_t|\lambda)} \quad (5)$$

The Fisher Vector is obtained by partializing the parameters of the Gaussian model. The derivation formula for each parameter is as shown in Equation 6~8, where the superscript d represents the d-th dimension of the vector:

$$\frac{\partial L(X|\lambda)}{\partial \omega_i} = \sum_{t=1}^{T} \left[\frac{\gamma_t(i)}{\omega_i} - \frac{\gamma_t(1)}{\omega_1}\right] \quad (6)$$

$$\frac{\partial L(X|\lambda)}{\partial \mu_i^d} = \sum_{t=1}^{T} \gamma_t(i) \left[\frac{x_t^d - \mu_i^d}{(\sigma_i^d)^2}\right] \quad (7)$$

$$\frac{\partial L(X|\lambda)}{\partial \sigma_i^d} = \sum_{t=1}^{T} \gamma_t(i) \left[\frac{(x_t^d - \mu_i^d)^2}{(\sigma_i^d)^3} - \frac{1}{\sigma_i^d}\right] \quad (8)$$

The Fisher Vector is a vector combining the derivation results of all the parameters. Because the number of Gaussian functions in the Gaussian Mixture Model (GMM) is G and the vector dimension is dw, the dimension of the Fisher Vector is (2×dw+1)×G−1. Given the constraint of the sum of weights ω being 1, the degree of freedom is G−1. G is the number of Gaussian functions in the Gaussian model.

Finally, substituting the word vector set $W_i$ of each text word in $W=\{W_1, W_2, \ldots, W_n\}$ into X in Equation 1, and obtaining the Fisher Vector for each text, denoted as $T=\{T_1, T_2, \ldots, T_n\}$, $T_i \in R^{(2 \times dw+1) \times G-1}$, $i \in [1,n]$, where $T_i$ represents the Fisher Vector calculated from the ith text.

In step 4), training the semantic matching model based on logistic regression using the image features and text features in the training data obtained by performing Step 2) and Step 3).

The obtained image features are $I=\{I_1, I_2, \ldots, I_n\}$, $I_j \in R^{4096}$.

The obtained text features are $T=\{T_1, T_2, \ldots, T_n\}$, $T_i \in R^{(2 \times dw+1) \times G-1}$.

For the corresponding image feature and text feature, there is a common label, $L=[l_1, l_2, \ldots, l_n]$, where $l_i \in [1, 2, \ldots, C]$.

Converting the text feature $T_i$ into a semantic feature $\Pi^T$ consisting of posterior probabilities, wherein the posterior probability is $P_{L|T_i}(k|T_i)$, $k \in [1,C]$, indicating the probability of $T_i$ belonging to category k, where calculate to get $P_{L|T_i}(k|T_i)$ using Equation 9:

$$P_{L|T_i}(k|T_i) = P_{L|T_i}(k|T_i; w^T) = \frac{\exp((w_k^T)'T_i)}{\sum_{j=1}^{C} \exp((w_j^T)'T_i)}, \quad (9)$$

where $w^T = \{w_1^T, w_2^T, \ldots, w_C^T\}$, $w_k^T \in R^{D_T}$, is a parameter of the multi-class logistic regression linear classifier, $(w_k^T)'$ represents the transpose of $w_k^T$, $w_k^T$ corresponds to category k, where $D_T = (2 \times dw + 1) \times G - 1$, $D_T$ is the dimension of the text feature.

In this way, the text feature T is converted into a text semantic feature $\Pi^T$, $\Pi^T = \{\Pi_1^T, \Pi_2^T, \ldots, \Pi_n^T\}$, $\Pi_i^T \in R^c$, $i \in [1,n]$, c is the number of categories, and is also the dimension of the semantic features of the text. The superscript d represents the d-th dimension in the vector, which is expressed as Equation 10:

$$(\Pi_i^T)^d = P_{L|T_i}(d|T_i), d \in [1,c]. \quad (10)$$

Similarly, the image feature is converted into a semantic feature composed of posterior probabilities, the posterior probability is $P_{L|I_i}(k|I_i)$, $k \in [1,C]$, indicating the probability of image $I_i$ belonging to category k, where $P_{L|I_i}(k|I_i)$ is calculated as follows:

$$P_{L|I_i}(k|I_i) = P_{L|I_i}(k|I_i; w^I) = \frac{\exp((w_k^I)'T_i)}{\sum_{j=1}^{C} \exp((w_j^I)'T_i)}, \quad (11)$$

where $w^I = \{w_1^I, w_2^I, \ldots, w_C^I\}$, $w_k^I \in R^{D_I}$, is a parameter of the multi-class logistic regression linear classifier, $w_k^I$ corresponds to category k, which is a vector of $D_I$ dimension, $D_I$ is the dimension of image features.

In this way, the image feature T is converted into the image semantic feature $\Pi^I$, $\Pi^I = \{\Pi_1^I, \Pi_2^I, \ldots, \Pi_n^I\}$, $\Pi_i^I \in R^c$, $i \in [1,n]$, c is the number of categories, and is also the dimension of the semantic features of the image. The superscript d represents the d-th dimension in the vector, which is expressed as Equation 12:

$$(\Pi_i^I)^d = P_{L|I_i}(d|I_i), d \in [1,c]. \quad (12)$$

The semantic features of images and texts are calculated in the above steps and are trained to obtain a semantic matching model.

In step 5), using semantic matching model trained in Step 4), and the image features and text features of the test data obtained in Step 2) and Step 3), to test an image (or text) to obtain related texts (or images), and test effects of the present invention.

For the image-search-text (Img2Text), the correlation is calculated between the image semantic feature $\Pi^I$ and the text semantic feature $\Pi^T$, and the text semantic feature $\Pi^T$ is sorted descending by the correlation, the larger correlation the text related to the image $\Pi^I$, the front the text.

Similarly, for the text-search-image (Text2Img), calculate the correlation between the text semantic feature $\Pi^T$ and the image semantic feature $\Pi^I$, and the image semantic feature $\Pi^I$ is sorted descending by the correlation, the larger correlation the image related to the text $\Pi^T$, the front the image.

The above-described correlation can include measurement methods such as Kullback-Leibler divergence (KL), Normalized Correlation (NC), Centered Correlation (CC), or L2 paradigm (L2).

For the results of the image-search-text (Img2Text) and the text-search-image (Text2Img), the MAP (Mean Average Precision) is calculated to measure the search result.

Figure 2:
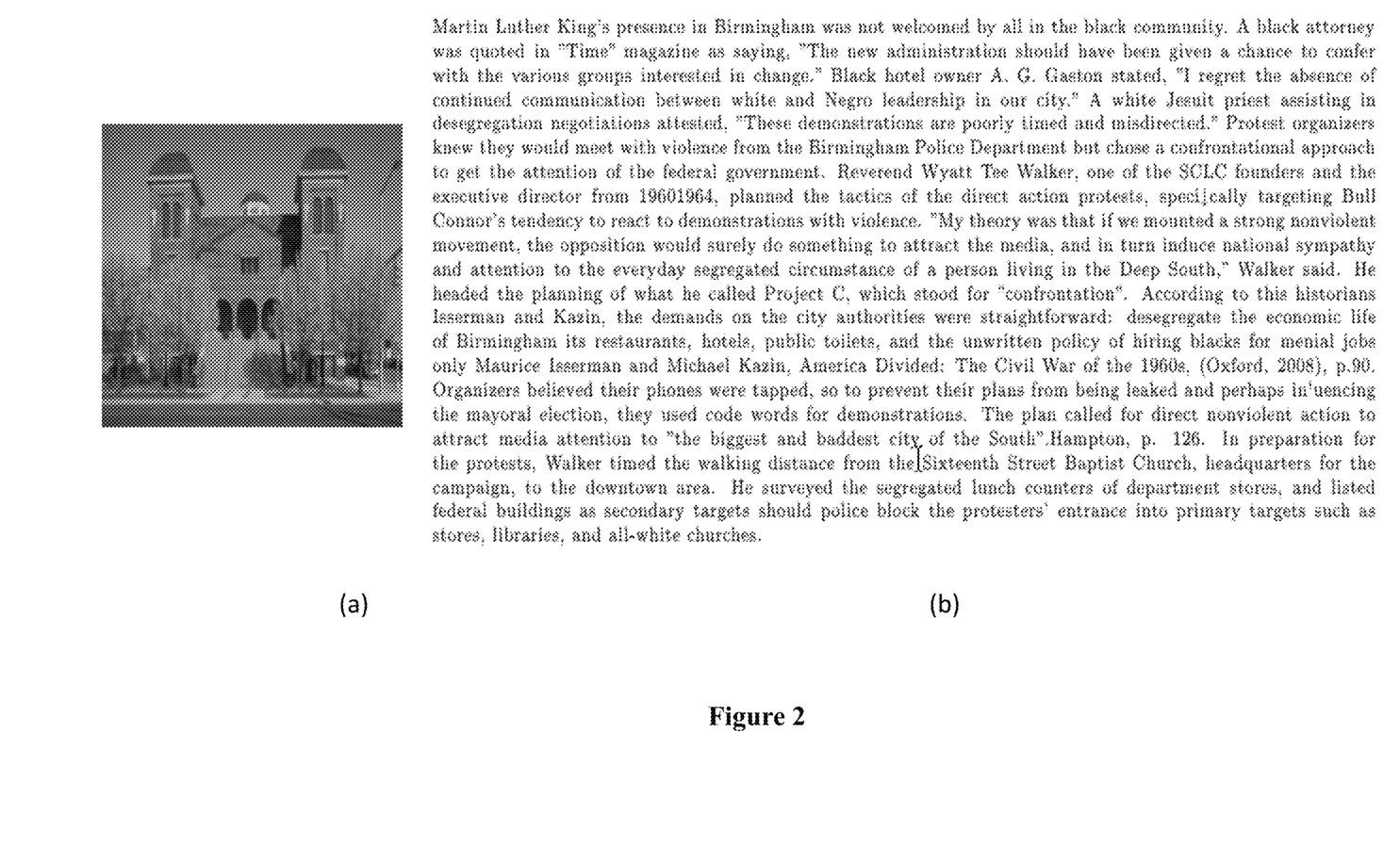
FIG. 2 shows an image and a text using a wikipedia dataset used in an implementation example in the present invention, where (a) is an image in the wikipedia dataset; (b) is a text corresponding to the image, the text in the form of a long paragraph.

In specific implementations, Implementation Example 1 uses a wikipedia dataset, which includes 2866 images and texts, and there are 10 categories, namely: Art & Architecture, Biology, Geography & Places, History, Literature & Theatre, Media, Music, Royalty & Nobility, Sport & Recreation and Warfare. The data were classified into 2173 training data and 693 test data. An example of the image and text of the dataset is shown in FIG. 2. Each image corresponds to a long text. The image features and the text features are obtained in Step 2) and Step 3). Among them, the text data first uses textteaser (an automatic open source text digest tool) to extract the first two topic sentences of each text, extract the Fisher Vector features for each topic sentence, and then connects the Fisher Vector features of the two sentences together to form a feature with higher dimensions as the final feature. For example, if the Fisher vector feature in one sentence is d-dimensional, the final feature is 2d-dimensional after the two sentences are connected. Then, the semantic matching model is obtained after training according to Step 4), and the test sample is processed according to Step 5) to obtain the search result.

The experimental results show that compared with the existing methods, the presently disclosed method has achieved superior results in both the Img2Text and the Text2Img tasks. Methods for extracting traditional artificial features for cross-media search for comparison include CCA[2], LCFS[3], CDLFA[4] and HSNN[5]. The text features used are 10-dimensional Latent Dirichlet Allocation (LDA) features, and the image features are 128-dimensional SIFT features.

Additionally, the presently disclosed method is compared with the latest cross-media search results using deep learning in paper CVF [6]. The text feature in CVF[6] uses 100-dimensional LDA features, and the image features use the 4096-dimensional DeCAF depth network CNN features.

The experimental results are given in the following table. The results containing Proposed are the results of the present invention. The effect of the method in the present invention is greatly improved compared with the methods of CCA [2], LCFS [3], CDLFA [4] and HSNN [5], similar to the method in the latest CVF [6]. The effect of the method using the CC correlation metric has shown improvement over CVF [6].

TABLE 1

Experiment results of Wikipedia dataset

| Methods | Img2Text | Text2Img |
| --- | --- | --- |
| CCA[2] | 0.2449 | 0.1929 |
| LCFS[3] | 0.2340 | 0.2122 |
| CDLFA[4] | 0.2628 | 0.2335 |
| HSNN[5] | 0.2839 | 0.2018 |
| CNN[6] | 0.4300 | 0.3700 |
| Proposed (KL) | 0.4098 | 0.2948 |
| Proposed (NC) | 0.4374 | 0.3498 |
| Proposed (CC) | 0.4452 | 0.3829 |
| Proposed (L2) | 0.4178 | 0.3130 |

Implementation Example 2 uses a Pascal Sentence dataset, which contains 1000 pairs of image-text data, divided into 20 categories (corresponding to category labels), including aircraft, cars, birds etc. (Table 2); each category contains 50 pairs of images and text.

TABLE 2

20 categories of Pascal Sentence dataset

| | |
| --- | --- |
| aeroplane | diningtable |
| bicycle | dog |

TABLE 2-continued 20 categories of Pascal Sentence dataset

| | |
|---|---|
| boat | house |
| bird | motorbike |
| bottle | person |
| bus | pottedplant |
| car | sheep |
| cat | sofa |
| chair | train |
| cow | tvmonitor |

Figure 3:
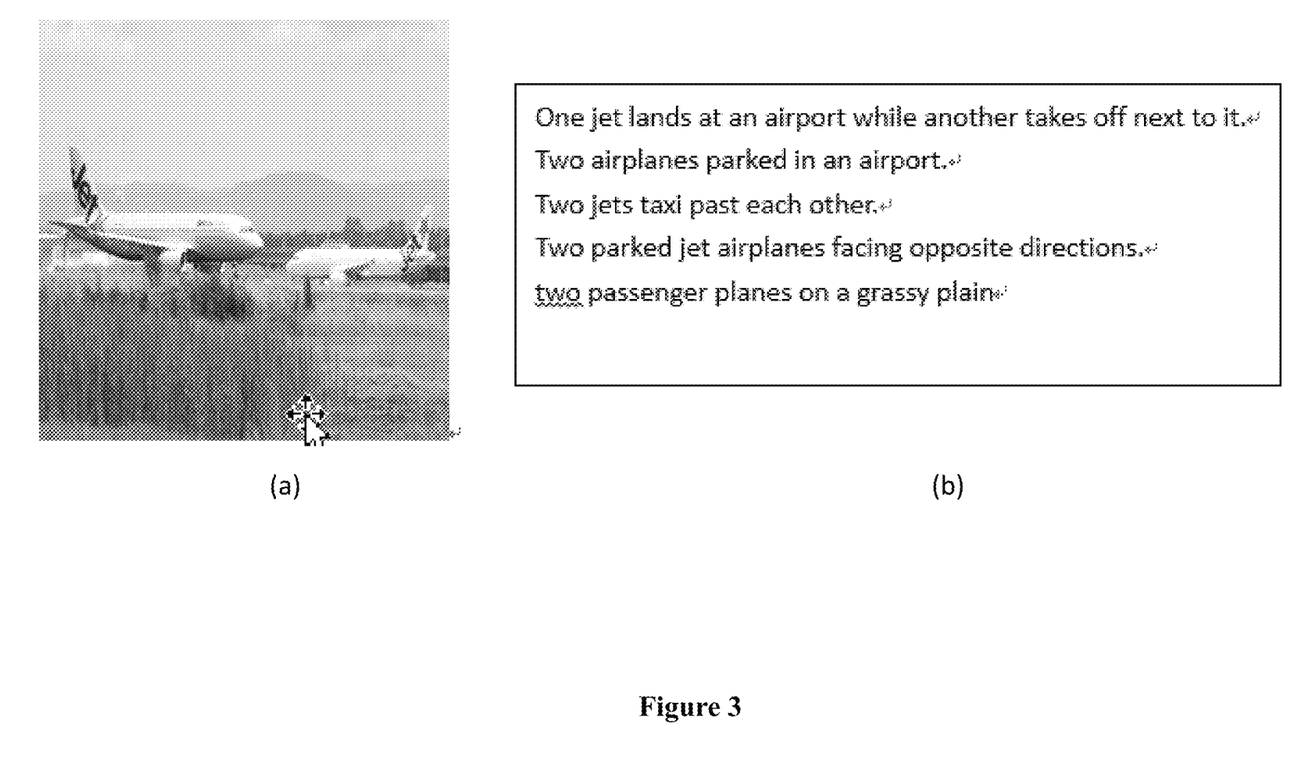
FIG. 3 shows an image and a text of a pascal sentence dataset used in an implementation example in the present invention, where (a) is an image in the pascal sentence dataset; (b) is the text corresponding to the image, and the text contains five sentences.

An example of image and text data is shown in FIG. 3, in which each image corresponds to 5 sentences. Sample 30 pairs of images and texts randomly from each category. Total 600 pairs were used as training data, and the remaining 400 pairs were used as test data. The corresponding image features and text features are extracted through Step 2) and Step 3). Wherein, since the text data in Pascal Sentence is already a sentence, no text digest processing is needed, the Fisher Vector feature can be directly extracted. The Fisher vector feature of one sentence is D-dimension. Then, train according to Step 4) to obtain the semantic matching model. Then, train according to Step 4) to obtain the semantic matching model.

This dataset is not used in the methods in literature [2] [5] for evaluation, so we directly compare the results with that in CVF[6]. The results are shown in Table 3:

TABLE 3

Experiment results of PascalSentence dataset

| Methods | Img2Text | Text2Img |
|---|---|---|
| CVF[6] | 0.4960 | 0.4780 |
| Proposed (KL) | 0.5454 | 0.4542 |
| Proposed (NC) | 0.5675 | 0.5321 |
| Proposed (CC) | 0.5651 | 0.5584 |
| Proposed (L2) | 0.5456 | 0.4615 |

It can be seen from the experimental results that the search accuracy of the presently disclosed method has been greatly improved for the Pascal Sentence dataset.

It is to be noted that the above contents are further detailed description of the present invention in connection with the disclosed embodiments. The invention is not limited to the embodiments referred to, but may be varied and modified by those skilled in the field without departing from the conceive and scope of the present invention. The claimed scope of the present invention should be defined by the scope of the claims.

What is claimed is:

1. A cross-media search method which utilizes A VGG convolutional neural network (VGG net) proposed by VGG to extract image features, and utilizes a Fisher Vector based on Word2vec to extract text features, and performs semantic matching on heterogeneous images and the text features by means of logistic regression, to accomplish cross-media search, the method comprising:

Step 1 [)] collecting a cross-media search dataset containing category labels, set as $D=\{D_1, D_2, \ldots, D_n\}$, where n represents the size of dataset, wherein data types in the cross-media search dataset includes image and text media, represented as image-text pairs $D_i(D_i \in D)$, $D_i=(D_i^I, D_i^T)$, where $D_i^I$ represents the original data of the image, and $D_i^T$ represents the original text data, wherein the category labels are set as L, $L=[l_1, l_2, \ldots, l_n]$, where $l_i \in [1, 2, \ldots, C]$, C is the number of categories, and $l_i$ represents the category to which the ith pair of images and text belong; dividing the cross-media search dataset into training data and test data;

Step 2[)] for all image data $D^I$ in dataset D, where $D^I=\{(D_1^I, D_2^I, \ldots, D_n^I)\}$, using a VGG convolutional neural network (VGG net) to extract image features, wherein the 4096-dimensional features of a seventh fully-connected layer (fc7) in the VGG net, after processing by a ReLU activation function, are denoted as $I=(I_1, I_2, \ldots, I_n\}$, where $I_j \in R^{4096}$, $j \in [1,n]$, serving as the image features;

Step 3[)] for the text feature data $D^T$ in the dataset, where $D^T=\{D_1^T, D_2^T, \ldots, D_n^T\}$, using a Fisher Vector based on Word2vec to extract text features, which includes converting $D^T$ into a word vector set $W=\{(W_1, W_2, \ldots, W_n\}$, wherein W is a word vector set of words contained in $D^T$; substituting the word vector set Wi of each text word in $W=\{(W_1, W_2, \ldots, W_n\}$ into X, and obtaining the Fisher Vector for each text, denoted as $T=\{(T_1, T_2, \ldots, T_n\}$, $T_i \in R^{(2 \times dw+1) \times G-1}$, $i \in [1,n]$, where $T_i$ represents the Fisher Vector calculated from the ith text; thus extracting text features;

Step 4[)] training a semantic matching model based on logistic regression using the image features and text features in the training data obtained by performing Step 2[)] and Step 3 [)]; converting the text feature T into a text semantic feature $\Pi^T$, $\Pi^T=\{\Pi_1^T, \Pi_2^T, \ldots, \Pi_n^T\}$, $\Pi_i^T \in R^c$, $i \in [1,n]$, wherein c is the number of categories, also the dimension of the text semantic feature; and transforming the image feature $I_i$ into the semantic feature composed of the posterior probability, the posterior probability is $P_{L|I_i}(k|I_i)$, $k \in [1,C]$, indicating the probability of image $I_i$ belonging to category k; and Step 5[)] using the semantic matching model trained in Step 4[)], and the image features and text features of the test data obtained in Step 2[)] and Step 3[)], to test an image or text to obtain a cross-media search result comprising related texts or images.

2. The cross-media search method according to claim 1, wherein in Step 3[)], [step of] using a Fisher Vector based on Word2vec to extract text features comprises:

Step 6 [31)] converting the original text data $D^T$, where $D^T=\{(D_1^T, D_2^T, \ldots, D_n^T\}$, to a word vector set $W=\{W_1, W_2, \ldots, W_n\}$, and W is a word vector set of the words contained in $D^T$;

Step 7 [32)] recording the word as w, and the word vector corresponding to the word w as $f_{word2vec}(w)$; for $\forall w \in D_i^T$, $f_{word2vec}(w) \in W_i$, $i \in [1,n]$, that is $W_i=\{w_{i,1}, w_{i,2}, \ldots, w_{i,b_i}\}$, where $w_{i,j} \in R^{dw}$, $j \in [1,b_i]$, $w_{i,j}$ is the word vector corresponding to the word contained in $D_i^T$, dw is the dimension of the word vector, and $b_i$ is the number of words contained in $D_i^T$; and Step 8 [33)] using $X=\{x_1, x_2, \ldots, x_{nw}\}$ to represent the word vector set for a text, nw is the number of word vectors; letting the parameters of the mixed Gaussian model GMM be $\lambda$, $\lambda=\{\omega_i, \mu_i, \Sigma_i, i=1 \ldots G\}$, where $\omega_i$, $\mu_i$, $\Sigma_i$ represent the weight, mean vector and covariance matrix of each Gaussian function in a GMM function, respectively, and G represents the number of Gaussian functions in the model, wherein the GMM function is defined in following equation [as Equation 1]:

$$L(X|\lambda)=\Sigma_{t=1}^{nw} \log p(x_t|\lambda), \quad (1)$$

where $p(x_t|\lambda)$ represents probability generated by the GMM function for the vector $x_t(t\in[1,nw])$, expressed in following equation [as Equation 2]:

$$p(x_t|\lambda)=\Sigma_{i=1}^{G}\omega_i p_i(x_t|\lambda) \quad (2)$$

setting the sum of constraints of weight $\omega_i$ to 1, expressed in following equation [as Equation 3]:

$$\Sigma_{i=1}^{G}\omega_i=1, \quad (3)$$

where $p_i(x|\lambda)$ represents the ith Gaussian function in the GMM, given by following equation [Equation 4]:

$$p_i(x|\lambda) = \frac{\exp\left\{-\frac{1}{2}(x-\mu_i)^T \sum_i^{-1}(x-\mu_i)\right\}}{(2\pi)^{dw/2}|\Sigma_i|^{1/2}} \quad (4)$$

where dw is the dimension of the vector, and $|\Sigma_i|$ represents the determinant to get $\Sigma_i$, wherein $\gamma_t(i)$ represents the probability of vector $x_t$ generated by the ith Gaussian function, expressed as following equation [Equation 5]:

$$\gamma_t(i) = \frac{\omega_i p_i(x_t|\lambda)}{\sum_{j=1}^{N} \omega_j p_j(x_t|\lambda)} \quad (5)$$

Step 9 [34]] T obtaining the Fisher Vector by partializing the parameters of the Gaussian model, wherein the Fisher Vector is a vector combining the derivation results of all the parameters, where the number of Gaussian functions in the Gaussian Mixture Model (GMM) is G, and the vector dimension is dw, the dimension of the Fisher Vector is $(2\times dw+1)\times G-1$; the degree of freedom of the weight $\omega$ is N−1;

Step 10 [35] substituting each text word vector set Wi in $W=\{W_1, W_2, \ldots, W_n\}$ into the text word vector set X in Equation (1), to obtain the Fisher Vector for each text, denoted as $T=\{T_1, T_2, \ldots, T_n\}$, $T_i \in R^{(2\times dw+1)\times G-1}$, $i\in[1,n]$, where $T_i$ represents the Fisher Vector calculated from the ith text.

3. The cross-media search method according to claim 2, wherein in step of partializing the parameters of the Gaussian model in Step 9[34]], each parameter is derived according to in following equations [Equation 6~8]:

$$\frac{\partial L(X|\lambda)}{\partial \omega_i} = \sum_{t=1}^{T}\left[\frac{\gamma_t(i)}{\omega_i} - \frac{\gamma_t(1)}{\omega_1}\right] \quad (6)$$

$$\frac{\partial L(X|\lambda)}{\partial \mu_i^d} = \sum_{t=1}^{T}\gamma_t(i)\left[\frac{x_t^d - \mu_i^d}{(\sigma_i^d)^2}\right] \quad (7)$$

$$\frac{\partial L(X|\lambda)}{\partial \sigma_i^d} = \sum_{t=1}^{T}\gamma_t(i)\left[\frac{(x_t^d - \mu_i^d)^2}{(\sigma_i^d)^3} - \frac{1}{\sigma_i^d}\right] \quad (8)$$

where the superscript d represents a d-th dimension of the vector.

4. The cross-media search method according to claim 1, wherein in step 4[)], training a semantic matching model based on logistic regression comprises:

Step 11 [41]] converting the text feature $T_i$ into a semantic feature $\Pi^T$ consisting of posterior probabilities, wherein $\Pi^T=\{\Pi_1^T, \Pi_2^T, \ldots, \Pi_n^T\}$, $\Pi_i^T \in R^c$, $i\in[1,n]$, c being the number of categories and also the dimension of the semantic features of the text, is expressed in following equation [as Equation 10]:

$$(\Pi_i^T)^d = P_{L|T_i}(d|T_i), d\in[1,c] \quad (10)$$

where the superscript d represents the d-th dimension of the vector, the posterior probability is $P_{L|T_i}(k|T_i)$, $k\in[1,C]$, indicating the probability of $T_i$ belonging to category k;

calculating $P_{L|T_i}(k|T_i)$ using following equation [Equation 9]:

$$P_{L|T_i}(k|T_i) = P_{L|T_i}(k|T_i; w^T) = \frac{\exp((w_k^T)'T_i)}{\sum_{j=1}^{C}\exp((w_j^T)'T_i)}, \quad (9)$$

where $W^T=\{w_1^T, w_2^T, \ldots, w_C^T\}$, $w_k^T \in R^{D_T}$ is a parameter of the multi-class logistic regression linear classifier, $(w_k^T)'$ represents the transpose of $w_k^T$, $w_k^T$ corresponds to category k, where $D_T=(2\times dw+1)\times G-1$, $D_T$ is the dimension of the text feature;

Step 12 [42]] converting image feature T into image semantic feature $\Pi^I$, wherein $\Pi^I=\{\Pi_1^I, \Pi_2^I, \ldots, \Pi_n^I\}$, $\Pi_i^I \in R^c$, $i\in[1,n]$, c being the number of categories and also the dimension of the semantic features of the image, is expressed in following equation [as Equation 12]:

$$(\Pi_i^I)^d = P_{L|I_i}(d|I_i), d\in[1,c] \quad (12)$$

where the superscript d represents the d-th dimension of the vector, wherein the posterior probability is $P_{L|I_i}(k|I_i)$, $k\in[1,C]$, indicating the probability of image $I_i$ belonging to category k, where $P_{L|I_i}(k|I_i)$ is calculated as follows:

$$P_{L|I_i}(k|I_i) = P_{L|I_i}(k|I_i; w^I) = \frac{\exp((w_k^I)'T_i)}{\sum_{j=1}^{C}\exp((w_j^I)'T_i)} \quad (11)$$

where $w^I=\{w_1^I, w_2^I, \ldots, w_C^I\}$, $w_k^I \in R^{D_I}$, is a parameter of the multi-class logistic regression linear classifier, wherein $w_k^I$ corresponds to category k, a vector of $D_I$ dimensions wherein $D_I$ is the dimension of the image feature.

5. The cross-media search method according to claim 1, wherein in Step 5[)], step of testing an image or text to obtain the related text or image comprises a correlation measurement methods including one or more of the Kullback-Leibler divergence method, Normalized Correlation method, Centered Correlation method, or L2 paradigm method.

* * * * *